(12) United States Patent
Han et al.

(10) Patent No.: US 9,264,777 B2
(45) Date of Patent: Feb. 16, 2016

(54) CONTROL VIDEO CONTENT PLAY SPEED

(71) Applicant: KT Corporation, Seongnam-si, Gyeonggi-do (KR)

(72) Inventors: Young-Ho Han, Yongin-si (KR); Jong-Se Park, Anyang-si (KR); Hee-Kyung Kim, Seoul (KR); Chang-Sun Ryu, Seoul (KR); Sungwon Park, Seoul (KR); Sung-Chan Park, Seoul (KR)

(73) Assignee: KT CORPORATION (KR)

( * ) Notice: Subject to any disclaimer, the term of this patent is extended or adjusted under 35 U.S.C. 154(b) by 0 days.

(21) Appl. No.: 14/067,233

(22) Filed: Oct. 30, 2013

(65) Prior Publication Data

US 2014/0123195 A1    May 1, 2014

(30) Foreign Application Priority Data

Oct. 30, 2012    (KR) .................. 10-2012-0121124

(51) Int. Cl.

| | |
|---|---|
| H04N 21/2343 | (2011.01) |
| H04N 21/2365 | (2011.01) |
| H04N 21/2387 | (2011.01) |
| H04N 21/2662 | (2011.01) |
| H04N 21/466 | (2011.01) |
| H04N 21/472 | (2011.01) |
| H04N 21/234 | (2011.01) |
| H04N 21/2362 | (2011.01) |
| H04N 21/439 | (2011.01) |
| H04N 21/633 | (2011.01) |
| H04N 21/6336 | (2011.01) |
| H04N 21/84 | (2011.01) |
| H04N 21/845 | (2011.01) |

(52) U.S. Cl.
CPC ..... *H04N 21/47217* (2013.01); *H04N 21/2362* (2013.01); *H04N 21/23418* (2013.01); *H04N 21/4394* (2013.01); *H04N 21/633* (2013.01); *H04N 21/6336* (2013.01); *H04N 21/84* (2013.01); *H04N 21/845* (2013.01)

(58) Field of Classification Search
None
See application file for complete search history.

(56) References Cited

U.S. PATENT DOCUMENTS

| | | | |
|---|---|---|---|
| 6,424,789 B1 * | 7/2002 | Abdel-Mottaleb | ........... 386/278 |
| 2005/0076366 A1 * | 4/2005 | Yoshigahara | ...... H04N 5/44543 725/56 |
| 2009/0002477 A1 * | 1/2009 | Cutler | ................ G06K 9/00711 348/14.1 |
| 2012/0062732 A1 * | 3/2012 | Marman | ................... H04N 7/18 348/142 |
| 2012/0233740 A1 * | 9/2012 | Veillet | .............. A41D 19/01505 2/163 |
| 2012/0237040 A1 * | 9/2012 | Holland et al. | .................. 381/56 |
| 2013/0103849 A1 * | 4/2013 | Mao et al. | ...................... 709/231 |

FOREIGN PATENT DOCUMENTS

| | | |
|---|---|---|
| JP | 2001-222300 A | 8/2001 |
| JP | 2004-350043 A | 12/2004 |
| KR | 1020000040087 A | 7/2000 |

(Continued)

*Primary Examiner* — Brian T Pendleton
*Assistant Examiner* — Jean D Saint Cyr
(74) *Attorney, Agent, or Firm* — Brundidge & Stanger, P.C.

(57) ABSTRACT

In one example embodiment, a system includes a content provider configured to transmit video content including a plurality of scenes; and an apparatus configured to: receive an input including a target playing time of the video content and a condition for changing a playing speed, determine a priority value for each of the scenes based at least in part on the condition for changing the playing speed, and determine a playing speed of each of the scenes based at least in part on the determined priority value and the target playing time of the video content.

23 Claims, 11 Drawing Sheets

(56) References Cited

FOREIGN PATENT DOCUMENTS

| KR | 10-2000-0054561 | A | 9/2000 |
| KR | 10-0571347 | A | 4/2006 |
| KR | 1020060063826 | A | 6/2006 |
| KR | 10-1074850 | B1 | 10/2011 |

* cited by examiner

| | 61 | 62 | 63 | 64 | 65 | 66 |
|---|---|---|---|---|---|---|
| | SCENE INDEX | START TIME m:s:ms | END TIME m:s:ms | CATEGORY | PRIORITY VALUE $0 \leq x \leq 1.0$ | PLAYING SPEED |
| | 1 | 0:00:00 | 0:20:00 | START SCENE INTRO | 0.1 | 2.0 |
| | 2 | 0:20:00 | 0:40:34 | INTRO | 0.1 | 2.0 |
| | 3 | 0:40:34 | 1:30:01 | ORIGINAL SOUND TRACK | 0.2 | 1.8 |
| | 4 | 1:30:01 | 3:29:01 | ACTOR A | 0.4 | 1.6 |
| | 5 | 3:29:01 | 5:26:03 | ACTOR B | 0.5 | 1.5 |
| | 6 | 5:26:03 | 6:40:30 | DIALOG | 0.9 | 1.0 |
| | 7 | 6:40:30 | 9:54:20 | DIALOG | 0.9 | 1.0 |
| | 8 | 9:54:20 | 10:50:21 | ACTOR A | 0.5 | 1.5 |
| | 9 | 10:50:21 | 13:32:11 | SPECTACLE SCENE | 0.6 | 1.4 |
| | 10 | 13:32:11 | 15:22:54 | ACTOR A + ACTOR B | 0.5 | 1.5 |
| | ⋮ | ⋮ | ⋮ | ⋮ | ⋮ | ⋮ |

CONTROL VIDEO CONTENT PLAY SPEED

TECHNICAL FIELD

The embodiments described herein pertain generally to the control of a playing speed of video content.

BACKGROUND

When watching video content or multimedia content via a playing terminal, e.g., a TV set, a mobile phone, a computer, etc., if a user of the playing terminal wants to skip over some parts of the video content, or if the user wants to watch some other parts of the video content slowly, the user may control a playing speed of the video content by manually operating a mouse, a keyboard, a touch screen, or a remote control, etc.

SUMMARY

In one example embodiment, a system may include a content provider configured to transmit video content including a plurality of scenes, each scene having one or more contextually related frames; and an apparatus configured to: receive an input including a target playing time of the video content and a condition for changing a playing speed, determine a priority value for each of the scenes based at least in part on the condition for changing the playing speed, and determine a playing speed of each of the scenes based at least in part on the determined priority value and the target playing time of the video content.

In another example embodiment, an apparatus may include an input receiving unit configured to receive an input including a target playing time of video content that includes a plurality of scenes and a condition for changing a playing speed, each scene having one or more contextually related frames; an priority value determining unit configured to determine a priority value for each of the scenes based at least in part on the condition for changing the playing speed; and a play speed determining unit configured to determine a playing speed of each of the scenes based at least in part on the determined priority value and the target playing time of the video content.

In yet another example embodiment, a computer-readable storage medium having thereon computer-executable instructions that, in response to execution, may cause an apparatus to perform operations including: receiving an input including a target playing time of video content that includes a plurality of scenes and a condition for changing a playing speed, each scene having one or more contextually related frames; determining a priority value for each of the scenes based at least in part on the condition for changing the playing speed; and determining a playing speed of each of the scenes based at least in part on the determined priority value and the target playing time of the video content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 6 shows an illustrative example of playing speed data which may be generated by an apparatus by which at least portions of control of video content play speed may be implemented, in accordance with various embodiments described herein;

DETAILED DESCRIPTION

Figure 1:
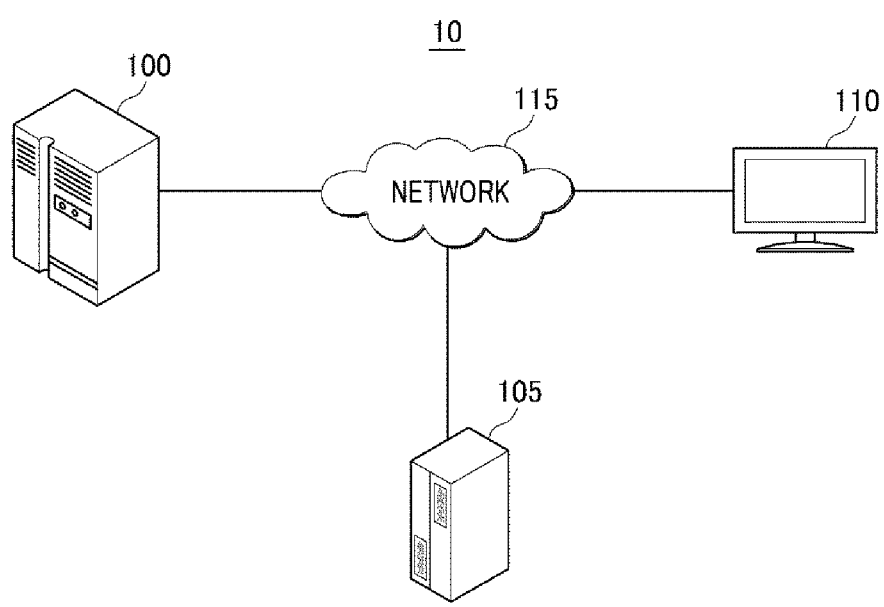
FIG. 1 shows an example system configuration in which one or more embodiments of control of video content play speed may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration in which one or more embodiments of control of video content play speed may be implemented, in accordance with various embodiments described herein. As depicted in FIG. 1, a system configuration 10 may include, at least, a content provider 100, an apparatus 105, and an end device 110. At least two or more of content provider 100, apparatus 105, and end device 110 may be communicatively connected to each other via a network 115.

Content provider 100 may refer to a service providing organization or entity that provides real-time broadcasting services and/or video-on-demand (VOD) services to end device 110. Content provider 100 may host one or more servers or other processing apparatuses that may be configured to receive a request for video content from end device 110, and to provide video content, which may include multiple scenes, each of which has one or more contextually related frames, to end device 110. Non-limiting examples of content provider 100 may include an Internet service provider (ISP); application service provider (ASP); storage service provider (SSP); and television service provider, i.e., cable TV, DSL and DBS.

Apparatus 105 may refer to a server, a processing device or a processing apparatus that may be configured to receive, from end device 110, an input that includes a target playing time of video content, which may refer to a playing time during which a user wishes to play the entire video content. By way of example, a user may enter a target playing time of one hour for the entire designated video content for which the original playing time is e.g., two hours.

Apparatus 105 may be configured to receive, from end device 110, further input that includes a condition to change a playing speed of identified video content. By way of example, apparatus 105 may receive, from end device 110, further input that includes a name, a facial image, or a voice file of a designated person (e.g., the user's favorite actor/actress), for whose scenes in the identified user content the user instructs to be viewed at a slower than a normal playback speed.

Apparatus 105 may be further configured to divide the video content into multiple scenes. Each scene may have one or more contextually related frames. Apparatus 105 may be configured to quantify a similarity between adjacent frames. For example, but not as a limitation, apparatus 105 may be configured to calculate the similarity by calculating an amount of changes (e.g., RGB changes) in corresponding pixels of the adjacent frames, and then determine each scene to have at least one frame from among the adjacent frames based on the quantified similarity. By way of example, but not limitation, apparatus 105 may be configured to compare the quantified similarity with a predetermined threshold value stored in a memory. Apparatus 105 may be configured to determine the adjacent frames to be contextually related and included in one scene, if the quantified similarity is equal to or larger than the predetermined threshold value.

Further, apparatus 105 may be configured to determine a priority value for each of the scenes of the video content based on the received condition for changing of the playing speed. By way of example, the priority value may refer to a numerical value that is assigned to each scene based on how much each scene satisfies the condition. The priority value may have a range of from zero to one.

For example, but not as a limitation, the condition for changing of the playing speed may include whether a designated person appears in the video content. Apparatus 105 may be configured to detect a facial image of the designated person from each scene of the video content. Apparatus 105 may be further to determine the priority value of each of the scenes based on whether the designated person appears or how long/often the designated person appears in respective ones of the scenes. Alternatively, apparatus 105 may be configured to detect a voice signal of the designated person from each scene of the video content. For example, but not as a limitation, apparatus 105 may be configured to recognize a voice signal from each scene of the video content by using known voice recognition technologies. Apparatus 105 may be configured to then detect the voice signal of the designated person from a voice database which stores metadata identifying speakers (e.g., persons), based at least in part on the recognized voice signal. Apparatus 105 may be further configured to determine the priority value of each of the scene based on whether the designated person is heard or how long/often the designated person is heard in respective scenes.

Further, as another non-limiting example, the condition for changing of the playing speed may include whether an amount of pixel changes in respective scenes is equal to or higher than a first threshold value. Apparatus 105 may be configured to calculate the amount of pixel changes (e.g., amount of RGB changes in corresponding pixels) in each scene of the video content and to compare the calculated amount of pixel changes with the first threshold value stored in a memory. If the calculated amount of pixel changes in a scene is equal to or higher than the first threshold value, apparatus 105 may be configured to determine that a priority value of the scene is higher than that of another scene in which the calculated amount of pixel changes is less than the first threshold value. Alternatively, apparatus 105 may be configured to determine the priority value of respective scenes in order of the calculated amount of pixel changes. For example, apparatus 105 may be configured to assign a highest priority value to a scene that has a largest pixel change amount, and to assign a lowest priority value to a scene that has a smallest pixel change amount.

Optionally, the condition for changing of the playing speed may include whether an audio signal magnitude in respective scenes is equal to or greater than a second threshold value. Apparatus 105 may be configured to calculate the audio signal magnitude in each scene of the video content, and to compare the calculated audio signal magnitude with the second threshold value stored in a memory. Apparatus 105 may be configured to determine a priority value of the scene to be equal to or greater than other scene in which the calculated audio signal magnitude is less than the second threshold value, if the calculated audio signal magnitude in a respective scene is equal to or greater than the second threshold value. Alternatively, apparatus 105 may be configured to determine the priority value of respective scenes according to the calculated audio signal magnitude in a consecutive order, as the audio signal magnitude increases.

As yet another non-limiting example, the condition for changing the playing speed may include whether a dialog among characters, fictional or real, is detected in various scenes of the video content. Apparatus 105 may be configured to detect any dialog from each scene of the video content. For example, apparatus 105 may be configured to detect at least one voice file from a scene. Further, apparatus 105 may be configured to determine a priority value of respective scene based on whether a dialog is detected. Apparatus 105 may be configured to determine a priority value of the scene to be higher than that of another scene in which dialog is not detected, if dialog is detected in a scene. Alternatively, apparatus 105 may be configured to determine the priority value of respective scenes in proportion to how long and/or how frequently dialog is heard in respective scenes.

Further, apparatus 105 may be configured to change a playing speed of respective scenes of the video content based at least in part on the determined priority value of respective scenes and the target playing time. For example, apparatus 105 may be configured to determine a playing speed of each scene of the video content in inverse proportion to the priority value in order for a total playing time for all of the scenes, each of which may be displayed with the determined playing speed, to be the target playing time. Further, in some embodiments, apparatus 105 may be configured to transmit information that includes the changed/determined playing speed of each of the scenes to content provider 100.

End device 110 may be configured to transmit a request for the video content to content provider 100. Further, end device 110 may receive, from content provider 100, the requested video content and the information including the determined playing speed of the scenes of the video content in response to the request. Further, end device 110 may be configured to play the video content while speeding up or slowing down the playing speed of at least one scene of the video content based on the information regarding the determined playing speed of each respective scene of the video content.

In some other embodiments, apparatus 105 may be configured to transmit, to end device 110, the information that includes the changed/determined playing speed of respective scenes of the video content. End device 110 may be configured to play the video content while speeding up or slowing down the playing speed of at least one scene of the video content based on the information regarding the changed playing speed of each respective scene of the video content.

In some other embodiments, apparatus 105 may be configured to transmit, to content provider 100, a request for the video content. Apparatus 105 may be configured to receive, from content provider 100, the requested video content in response to the request. Apparatus 105 may be further configured to play the video content while speeding up or slowing down the playing speed of at least one scene of the video content based on determined playing speed of each respective scene of the video content.

In some other embodiments, apparatus 105 may be configured to generate multiple sets of playing speed information for the video content according to various kinds of conditions for changing of the playing speed and various target playing times. Further, apparatus 105 may be configured to store the multiple sets of playing speed information in a memory that is communicatively coupled to apparatus 105. For example, apparatus 105 may be configured to determine a first priority value for each scene of the video content based on a first condition for changing the playing speed (e.g., whether a designated person appears in the video content). Further, apparatus 105 may be configured to determine a playing speed for each of the scenes based on the first priority value and a first target playing time (e.g., 1 hour). Apparatus 105 may be configured to then generate a first set of playing speed information that includes the playing speed of each of the scenes, which may be determined based on the first priority value and the first target playing time. Further, apparatus 105 may be configured to determine a second priority value for each scene based on a second condition for changing of the playing speed (e.g., an amount of pixel changes in respective scenes being equal to or greater than a threshold value). Further, apparatus 105 may be configured to determine a playing speed of each of the scenes based on the second priority value and a second target playing time (e.g., 1.5 hour). Apparatus 105 may be configured to then generate a second set of playing speed information that includes the playing speed of each scene, which may be determined based on the second priority value and the second target playing time.

Further, apparatus 105 may be configured to receive, from end device 110 an input to select a target playing time and a condition for changing of a playing speed. Apparatus 105 may be further configured to select one set of playing speed information from among the stored sets of playing speed information based on the input. Apparatus 105 may be configured to then transmit the selected set of playing speed information to at least one of content provider 100 or end device 110. For example, when apparatus 105 receives, from end device 200, an input that includes a target playing time (e.g., 1 hour) and a condition for changing of a playing speed (e.g., a name of a designated person appearing in the video content), apparatus 105 may select the first set of playing speed information that includes the playing speed for each of the scenes, which may be determined based on the first condition for changing of the playing speed (e.g., whether a designated person appears in the video content) and the first target playing time (e.g., 1 hour). Then, apparatus 105 may be configured to transmit the selected first playing speed information set to at least one of content provider 100 or end device 110.

End device 110 may refer to a notebook computer; a personal computer; a smart phone; a tablet computer; a phablet device; and/or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

For example, but not as a limitation, network 115, which may be configured to communicatively couple one or more of content provider 100, apparatus 105, and end device 110, may, be implemented in accordance with any wireless network protocol, such as the Internet, a mobile radio communication network including at least one of a 3rd generation (3G) mobile telecommunications network, a 4th generation (4G) mobile telecommunications network, any other mobile telecommunications networks, a satellite network, Bluetooth, WiBro (Wireless Broadband Internet), Mobile WiMAX, HSDPA (High Speed Downlink Packet Access) or the like.

Thus, FIG. 1 shows example system configuration 10 in which one or more embodiments of control of video content play speed may be implemented, in accordance with various embodiments described herein.

Figure 2:
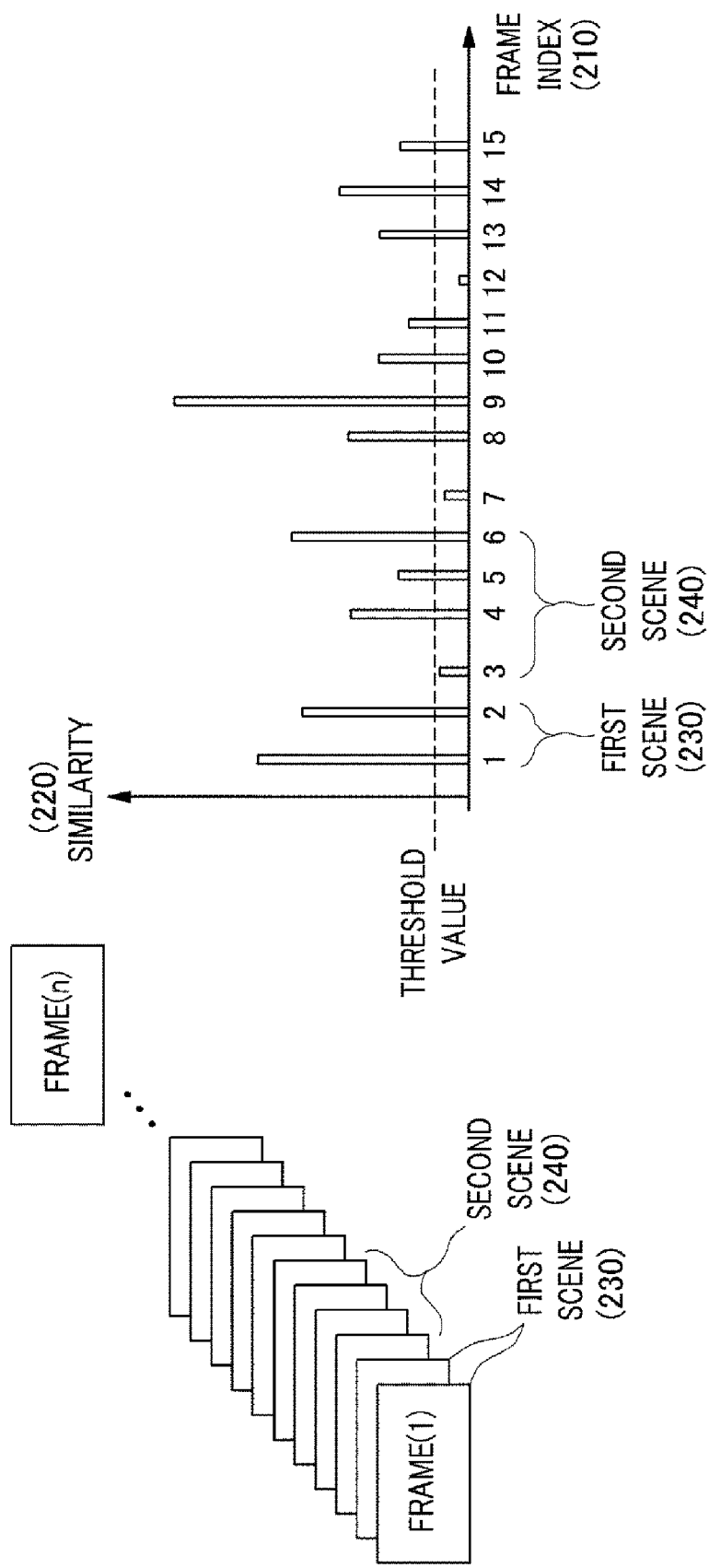
FIG. 2 shows an illustrative example of determining scenes having one or more contextually related frames, in accordance with various embodiments described herein.

FIG. 2 shows an illustrative example of determining scenes having one or more contextually related frames, in accordance with various embodiments described herein.

In some embodiments, apparatus 105 may be configured to quantify a similarity between a previous frame and a current frame. For example, but not as a limitation, apparatus 105 may be configured to quantify the similarity by calculating an amount of changes (e.g., RGB changes) in corresponding pixels of the previous frame and the current frame. Further, apparatus 105 may be configured to compare the quantified similarity between the previous frame and the current frame with a predetermined threshold value. If the quantified similarity between the previous frame and the current frame is equal to or greater than the predetermined threshold value, apparatus 105 may determine the previous frame and the current frame to be contextually related and included in one scene. Otherwise, if the quantified similarity between the previous frame and the current frame is less than the predetermined threshold value, apparatus 105 may determine that the previous frame and the current frame are not contextually related and are, therefore, included in separate scenes of the video content.

For example, but not as a limitation, apparatus 105 may be configured to calculate, starting with a similarity between a first frame and a second frame to a similarity between an (n−1)-th frame and an n-th frame. As illustrated in FIG. 2, an x-axis may refer to a frame index 210 of each frame and a y-axis may refer to a similarity 220. If the similarity between the first frame and the second frame is equal to or greater than the predetermined threshold value, but the similarity between the second frame and a third frame is less than the threshold predetermined value, apparatus 105 may determine that a first scene 230 of the video content includes the first frame and the second frame, and that a second scene 240 of the video content includes the third frame. Further, if a similarity between the third frame and a fourth frame, a similarity between the fourth frame and a fifth frame, and a similarity between the fifth frame and a sixth frame are equal to or greater than the predetermined value, but that the similarity between the sixth frame and a seventh frame is less than the predetermined threshold value, apparatus 105 determine that second scene 240 of the video content includes the third frame, fourth frame, fifth frame and sixth frame and a third scene of the video content includes the seven frame.

Thus, FIG. 2 shows an illustrative example of determining scenes having one or more contextually related frames, in accordance with various embodiments described herein.

Figure 3A:
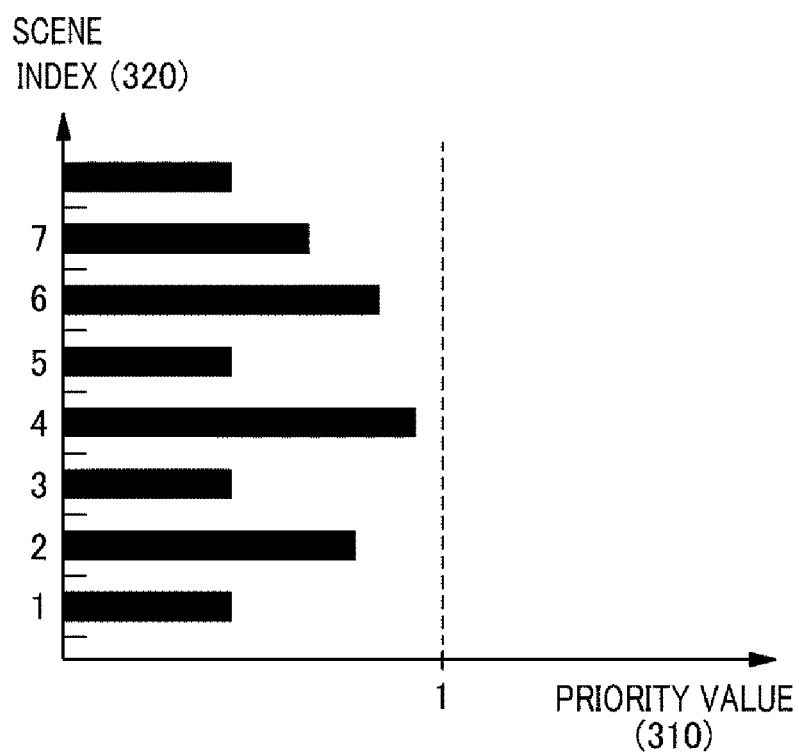
FIG. 3A shows illustrative example graphs showing distribution of priority values of each scene, in accordance with various embodiments described herein.
Figure 3B:
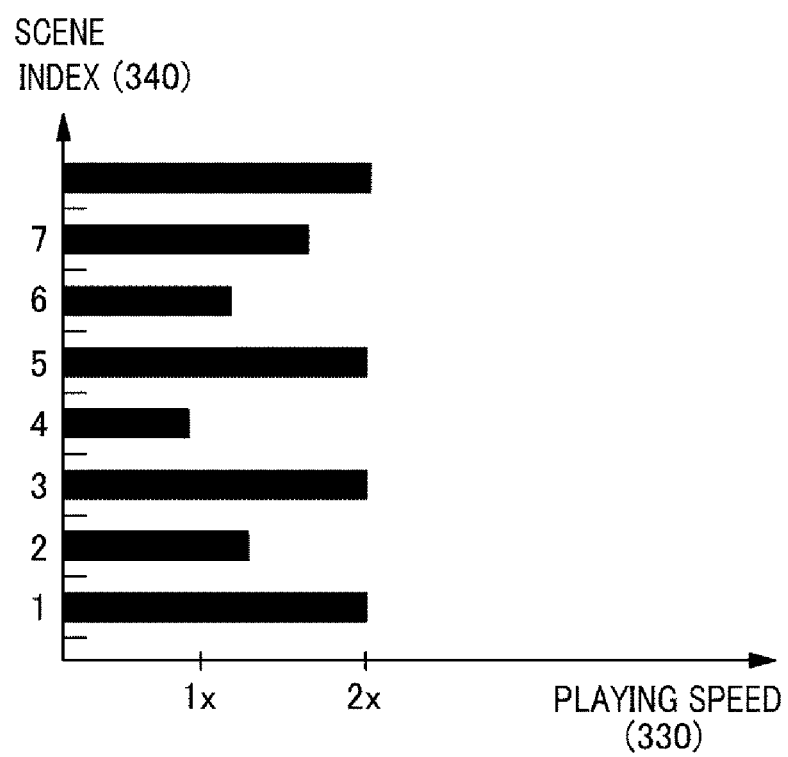
FIG. 3B shows illustrative example graphs showing distribution playing speeds of each scene, in accordance with various embodiments described herein.

FIG. 3A shows illustrative example graphs showing distribution of priority values of each scene, in accordance with various embodiments described herein; and FIG. 3B shows illustrative example graphs showing distribution playing speeds of each scene, in accordance with various embodiments described herein. As depicted in FIG. 3A, an x-axis may refer to a priority value 310 of each scene and a y-axis may refer to a scene index 320 of each scene. Apparatus 105 may be configured to determine a various priority value for each of scenes of video content. Further, as depicted in FIG. 3B, an x-axis may refer to a playing speed 330 of each scene and a y-axis may refer to a scene index 340 of each scene. Apparatus 105 may be configured to determine a various playing speed of each of the scenes of the video content in inverse proportion to the priority value. Although, in FIG. 3B, the playing speed of each scene is determined within a range from an original speed to a doubled speed, but the playing speed of each scene may be determined to be slower than the original speed or to be faster than the doubled speed.

Thus, FIG. 3A shows illustrative example graphs showing distribution of priority values of each scene, in accordance with various embodiments described herein, and FIG. 3B shows illustrative example graphs showing distribution playing speeds of each scene, in accordance with various embodiments described herein.

Figure 4:
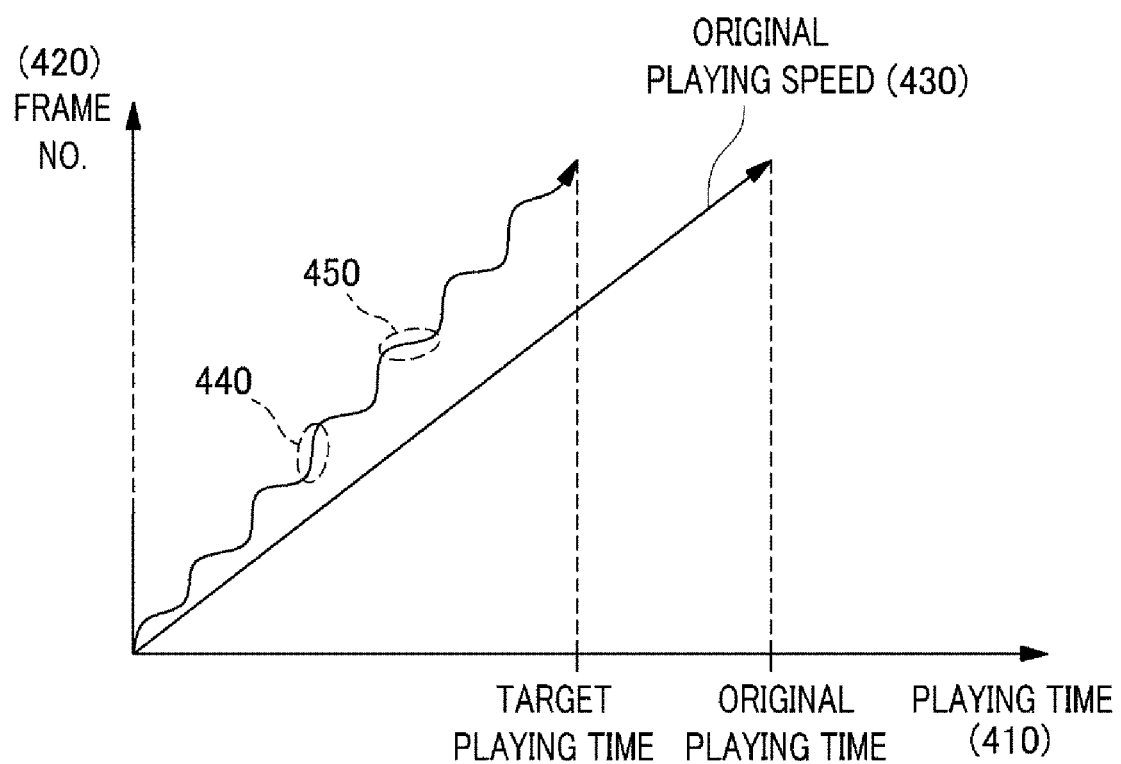
FIG. 4 shows a graph that shows results of the control of video content play speed, in accordance with various embodiments described herein.

FIG. 4 shows a graph that shows results of the control of video content play speed, in accordance with various embodiments described herein. As depicted in FIG. 4, an x-axis may refer to a playing time 410 of video content and a y-axis may refer to a frame number 420. Respective frames of video content may be displayed with a various playing speed (e.g., a faster speed 440 than an original speed 430 or a slower speed 450 than original speed 430) so that a total playing time for the video content may be a target playing time.

Thus, FIG. 4 shows a graph that shows results of the control of video content play speed, in accordance with various embodiments described herein.

Figure 5A:
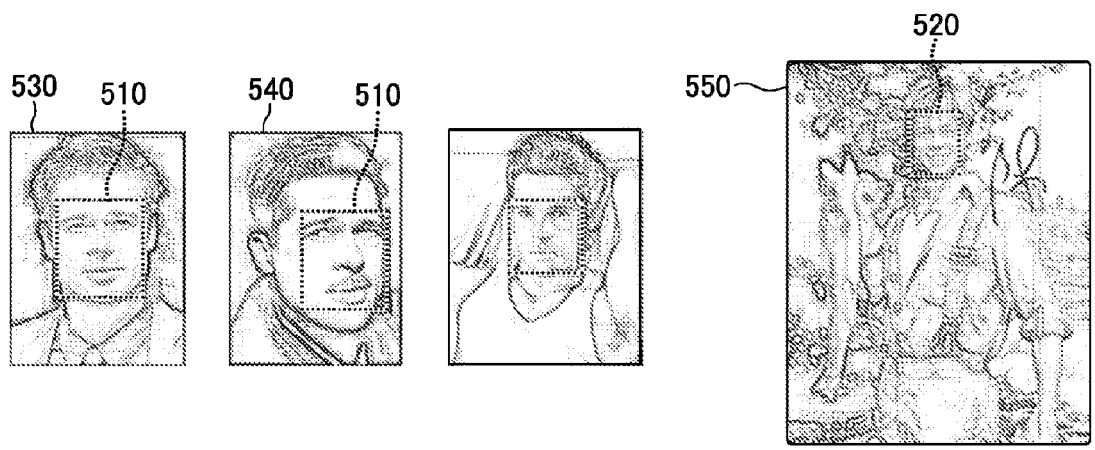
FIG. 5A shows an illustrative example of a determination of a priority value of one or more scenes based on a condition for changing of a video content playing speed, in accordance with various embodiments described herein.

FIG. 5A shows an illustrative example of a determination of a priority value of one or more scenes based on a condition for changing of a video content playing speed, in accordance with various embodiments described herein. By way of example, but not limitation, if a condition for changing of a playing speed is whether a designated person appears in video content, apparatus 105 may be configured to search for and detect a facial image 510 of the designated person from a web page 530 or a web site 540. Further, apparatus 105 may be configured to search for and detect a facial image 520 from each scene 550 of the video content. Then, apparatus 105 may be configured to calculate a similarity between the detected facial image 510 of the designated person and facial image 520 detected from each of the scenes. Apparatus 105 may be configured to determine that the designated person appears in some scenes based on the calculated similarity. Further, apparatus 105 may be configured to determine a priority value of a scene in which the designated person appears to be equal to or greater than a priority value of another scene in which the designated person does not appear. Further, among multiple scenes in which the designated person appears, apparatus 105 may be configured to determine a priority value of respective scene of the multiple scenes in proportion to the calculated similarity.

Thus, FIG. 5A shows an illustrative example of a determination of a priority value of one or more scenes based on a condition for changing of a video content playing speed, in accordance with various embodiments described herein.

Figure 5B:
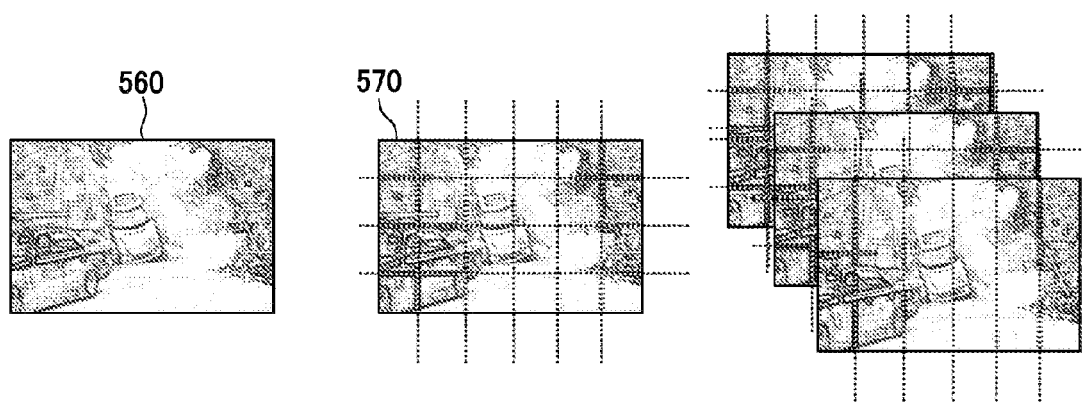
FIG. 5B shows another illustrative example of a determination of a priority value of one or more scenes based on a condition for changing of a playing speed, in accordance with various embodiments described herein.

FIG. 5B shows another illustrative example of a determination of a priority value of one or more scenes based on a condition for changing of a playing speed, in accordance with various embodiments described herein. By way of example, but not limitation, if a condition for changing of a playing speed is whether an amount of pixel changes in the respective scenes is higher than a threshold value, apparatus 105 may divide each scene 560 of video content into multiple areas 570. Further, apparatus 105 may be configured to calculate an amount of pixel changes (e.g., RGB changes) in respective areas 570, as time goes on. Then, apparatus 105 may be configured to sum up the amounts of pixel changes in the multiple areas 570 and to calculate an average amount of pixel changes of each scene 560 of the video content. Further, apparatus 105 may be configured to determine whether the average amount of pixel changes of each scene is equal to or greater than a threshold value stored in a memory. Apparatus 105 may be configured to determine a priority value of a scene of which the average amount of pixel changes is equal to or greater than the threshold value to be higher than a priority value of another scene of which the average amount of pixel changes is less than the threshold value. Alternatively, apparatus 105 may be configured to determine a priority value of respective one scene of multiple scenes in proportion to the calculated average amount of pixel changes of each scene.

Thus, FIG. 5B shows another illustrative example of a determination of a priority value of one or more scenes based on a condition for changing of a playing speed, in accordance with various embodiments described herein.

FIG. 6 shows an illustrative example of playing speed data which may be generated by an apparatus by which at least portions of control of video content play speed may be implemented, in accordance with various embodiments described herein. Apparatus 105 may generate playing speed data 60 pertaining to particular video content. For example, but not as a limitation, playing speed data 60 may include at least one of a scene index 61 for each scene, a start time 62 for each scene, an end time 63 for each scene, a category 64 for each scene, a priority value 65 for each scene, and/or determined playing speed 66 for each scene. Apparatus 105 may generate playing speed data 60 of the video content according to a received condition for changing the playing speed. For example, if a condition for changing the playing speed is the detection of dialog in a respective scene, as depicted in FIG. 6, priority values of the sixth scene and seventh scene are respectively higher than that of other scenes due to the detected presence of dialog in the sixth and seventh scenes. As a result, the playing speeds of the sixth scene and seventh scene are slower than all of the other scenes of the particular video content.

Thus, FIG. 6 shows an illustrative example of playing speed data which may be generated by an apparatus by which at least portions of control of video content play speed may be implemented, in accordance with various embodiments described herein.

Figure 7:
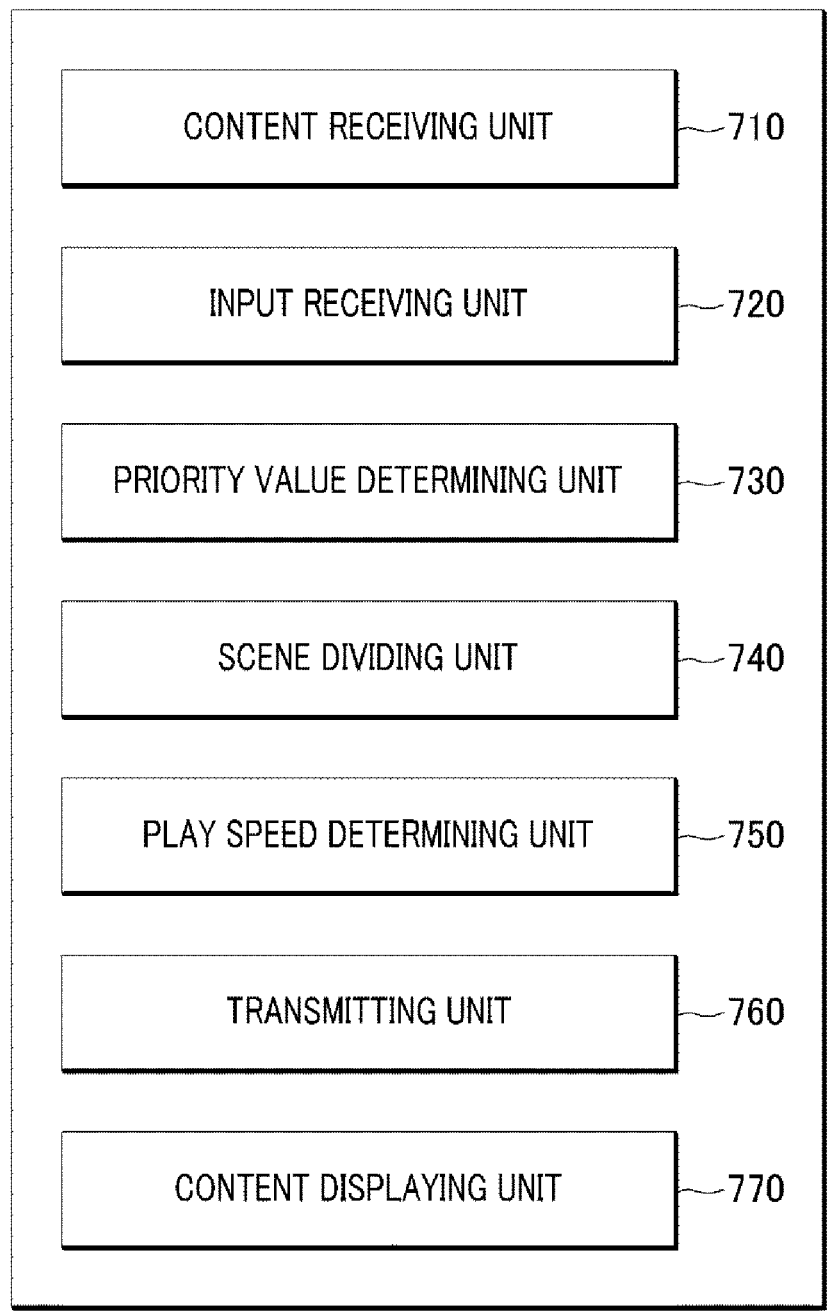
FIG. 7 shows an example configuration of an apparatus by which at least portions of control of video content play speed may be implemented, in accordance with various embodiments described herein.

FIG. 7 shows an example configuration of an apparatus by which at least portions of control of video content play speed may be implemented, in accordance with various embodiments described herein. As depicted in FIG. 7, apparatus 105 may include a content receiving unit 710, an input receiving unit 720, a priority value determining unit 730, a scene dividing unit 740, a play speed determining unit 750, a transmitting unit 760 and a content displaying unit 770. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of content receiving unit 710, input receiving unit 720, priority value determining unit 730, scene dividing unit 740, play speed determining unit 750, transmitting unit 760 and content displaying unit 770 may be included in an instance of an application hosted on apparatus 105.

Content receiving unit 710 may be configured to transmit a request for video content to content provider 100. Further, content receiving unit 710 may be configured to receive the video content from content provider 100. The received video content may include multiple scenes, each of which may have one or more contextually related frames.

Input receiving unit 720 may be configured to receive an input that includes a target playing time of the video content and a condition for changing of a playing speed of the video content. In some embodiments, input receiving unit 720 may be configured to receive the input from end device 110. In some other embodiments, a user of apparatus 105 may enter the input via a user interface displayed on a display, which may be communicatively coupled to apparatus 105, and input receiving unit 720 may be configured to receive the input.

Priority value determining unit 730 may be configured to determine a priority value for each scene of the video content based on the received condition for changing the playing speed of the respective scenes. For example, but not as a limitation, the condition for changing of the playing speed may include whether a designated person appears in the video content. Priority value determining unit 730 may be configured to detect a facial image of the designated person in each scene of the video content and to then determine the priority value for each of the scenes based on whether the designated person appears. Optionally, priority value determining unit 730 may be configured to determine the priority value for each scene in proportion to how long/often the designated person appears in the respective scenes. Alternatively, priority value determining unit 730 may be configured to detect a voice signal of the designated person in each scene of the video content and to then determine the priority value for each scene based on whether the designated person is heard or how long and/or often the designated person is heard in respective scenes.

As another non-limiting example, the condition for changing the playing speed may include whether an amount of pixel changes in respective scenes is equal to or greater than a first threshold value. Priority value determining unit 730 may be configured to calculate the amount of pixel changes in each scene of the video content, and to compare the calculated amount of pixel changes with the first threshold value that is stored in a memory. If the calculated amount of pixel changes in a scene is equal to or greater than the first threshold value, priority value determining unit 730 may determine that a priority value for the scene is higher than another scene for which the calculated amount of pixel changes is less than the first threshold value. Alternatively, priority value determining unit 730 may be configured to determine the priority value for respective scenes according to the calculated amount of pixel changes in a consecutive order, as the amount of pixel changes increases.

Alternatively, a condition for changing of the playing speed may include whether an audio signal magnitude in respective scenes is higher than a second threshold value. Priority value determining unit 730 may be configured to calculate the audio signal magnitude in each scene of the video content, and to compare the calculated audio signal magnitude with the second threshold value that is stored in a memory. If the calculated audio signal magnitude for a scene is equal to or greater than the second threshold value, priority value determining unit 730 may determine a priority value for the scene to be equal to or greater than another scene in which the calculated audio signal magnitude is less than the second threshold value. Alternatively, priority value determining unit 730 may be configured to determine the priority value for respective scenes according to the calculated audio signal magnitude in a consecutive order, as the audio signal magnitude increases.

As another non-limiting example, a condition for changing of the playing speed may include whether dialog is detected in respective scenes. Priority value determining unit 730 may be configured to detect dialog in each scene of the video content, and to determine the priority value of respective scenes based on whether dialog is detected. Alternatively, priority value determining unit 730 may be configured to determine the priority value for respective scenes in proportion to how long and/or often dialog is detected in respective scenes.

Scene dividing unit 740 may be configured to divide the video content into multiple scenes. In some embodiments, scene dividing unit 740 may be configured to quantify a similarity between adjacent frames by calculating an amount of changes (e.g., RGB changes) in corresponding pixels of the adjacent frames. For example, scene dividing unit 740 may be configured to quantify similarity between a previous frame and a current frame by comparing pixels of each frame. Further, scene dividing unit 740 may be configured to determine that adjacent frames are contextually related and included in a common scene based on a quantified similarity. If the quantified similarity between the previous frame and the current frame is equal to or greater than a predetermined threshold value, scene dividing unit 740 may determine that the previous frame and the current frame are contextually related and included in a common scene. Otherwise, if the quantified similarity between the previous frame and the current frame is less than the predetermined threshold value, scene dividing unit 740 may determine that the previous frame and the current frame are not contextually related.

Play speed determining unit 750 may be configured to determine a playing speed for each scene of the video content based at least in part on the determined priority value for respective scenes and the target playing time. For example, play speed determining unit 750 may be configured to change a playing speed of each scene of the video content in inverse proportion to the priority value in order for a total playing time for all of the scenes to be the target playing time.

Transmitting unit 760 may be configured to transmit information that includes the determined playing speed of each of the scenes to at least one of content provider 100 or end device 110.

In some embodiments, content displaying unit 770 may be further configured to play the video content while speeding up or slowing down a playback of at least one scene of the video content based on determined playing speed of the at least one scene.

Although not illustrated in FIG. 7, apparatus 105 may include a play speed management component including at least some of content receiving unit 710, input receiving unit 720, priority value determining unit 730, scene dividing unit 740, play speed determining unit 750, transmitting unit 760 and content displaying unit 770; an operating system; and a processor. The play speed management component may be an application adapted to operate on the operating system such that the control of a video content play speed as described herein may be provided. The operating system may allow the play speed management component to manipulate the processor to implement the control of a video content play speed as described herein.

Thus, FIG. 7 shows an example configuration of apparatus 105 by which at least portions of control of video content play speed may be implemented, in accordance with various embodiments described herein.

Figure 8:
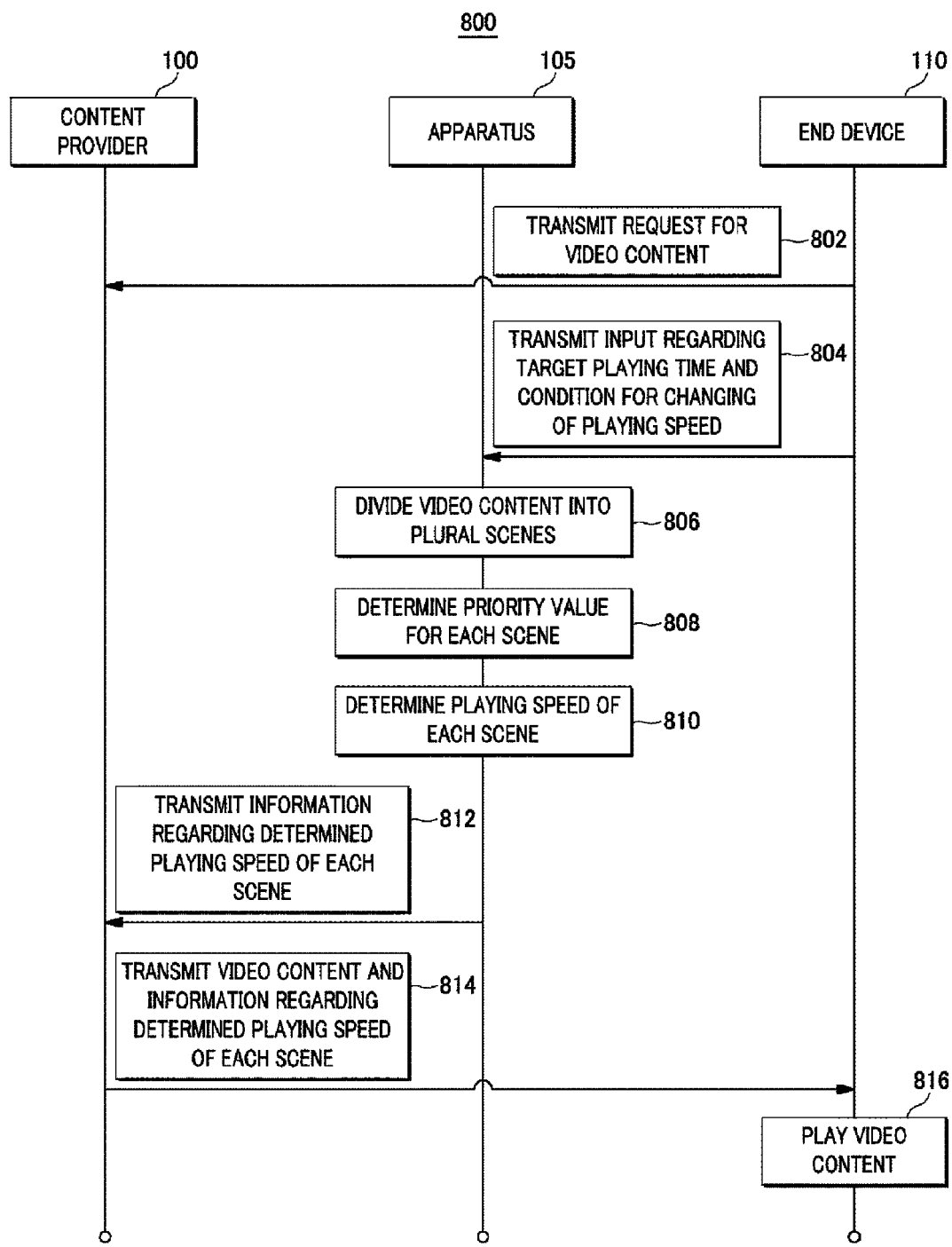
FIG. 8 shows an example processing flow of operations by which at least portions of control of video content play speed may be implemented, in accordance with various embodiments described herein.

FIG. 8 shows an example processing flow 800 of operations by which at least portions of control of video content play speed may be implemented, in accordance with various embodiments described herein. The operations of processing flow 800 may be implemented in system configuration 10 including content provider 100, apparatus 105 and end device 110, as illustrated in FIG. 1. Processing flow 800 may include one or more operations, actions, or functions as illustrated by one or more blocks 802, 804, 806, 808, 810, 812, 814 and/or 816. Although illustrated as discrete blocks, various blocks may be divided into additional blocks, combined into fewer blocks, or eliminated, depending on the desired implementation. Processing may begin at block 802.

Block 802 (Transmit Request for Video Content) may refer to end device 110 transmitting a request for video content to content provider 100 via network 200. Processing may proceed from block 802 to block 804.

Block 804 (Transmit Input regarding Target Playing Time and Condition for Changing of Playing Speed) may refer to end device 110 transmitting, to apparatus 105 via network 200, an input regarding a target playing time of the video content and a condition for changing a playing speed of the video content. Processing may proceed from block 804 to block 806.

Block 806 (Divide Video Content into Plural Scenes) may refer to apparatus 105 dividing the video content into plural scenes having one or more contextually related frames. In some embodiments, apparatus 105 may quantify a similarity between adjacent frames of the video content. As a non-limiting example, apparatus 105 may calculate the similarity by comparing pixels of each frame. Apparatus 105 may determine each scene based on the quantified similarity. By way of example, apparatus 105 may compare the quantified similarity to a predetermined threshold value. If the quantified similarity is equal to or greater than the predetermined threshold value, apparatus 105 may determine the adjacent frames to be contextually related and included in a common scene. Processing may proceed from block 806 to block 808.

Block 808 (Determine Priority Value for Each Scene) may refer to apparatus 105 determining a priority value for each scene based at least in part on the condition for changing the playing speed, which is received at block 804. As a non-limiting example, the condition for changing the playing speed may include whether a designated person appears in the video content. Apparatus 105 may detect a facial image of the designated person in one or more scenes of the video content, and determine the priority value of each scene based on whether the designated person appears. Alternatively, apparatus 105 may detect a voice signal of the designated person from each scene of the video content, and determine the priority value for each scene based on whether the designated person is heard in respective scenes. Processing may proceed from block 808 to block 810.

Block 810 (Determine Playing Speed of Each Scene) may refer to apparatus 105 determining a playing speed of each scene of the video content based at least in part on the priority value for respective scenes, which is determined at block 808, and the target playing time, which is received at block 804. By way of example, apparatus 105 may change a playing speed of each scene of the video content in inverse proportion to the priority value in order for a total playing time for all of the scenes to be the target playing time. Processing may proceed from block 810 to block 812.

Block 812 (Transmit Information Regarding Determined Playing Speed of Each Scene) may refer to apparatus 105 transmitting information regarding the determined playing speed of each scene of the video content to content provider 100 via network 200. Processing may proceed from block 812 to block 814.

Block 814 (Transmit Video Content and Information Regarding Determined Playing Speed of Each Scene) may refer to content provider 100 transmitting, to end device 110 via network 200, the video content and the information regarding the determined playing speed of each scene of the video content, in response to the content request of block 802. Processing may proceed from block 814 to block 816.

Block 816 (Play Video Content) may refer to end device 110 playing the video content. End device 110 may receive, from content provider 100, the video content and the information regarding the determined playing speed of the scenes of the video content. Further, end device 110 may play the video content while speeding up or slowing down a playing speed of at least one scene of the video content based on the information regarding the determined playing speed of each respective scene of the video content.

Thus, FIG. 8 shows an example processing flow 800 of operations by which at least portions of control of video content play speed may be implemented, in accordance with various embodiments described herein.

Figure 9:
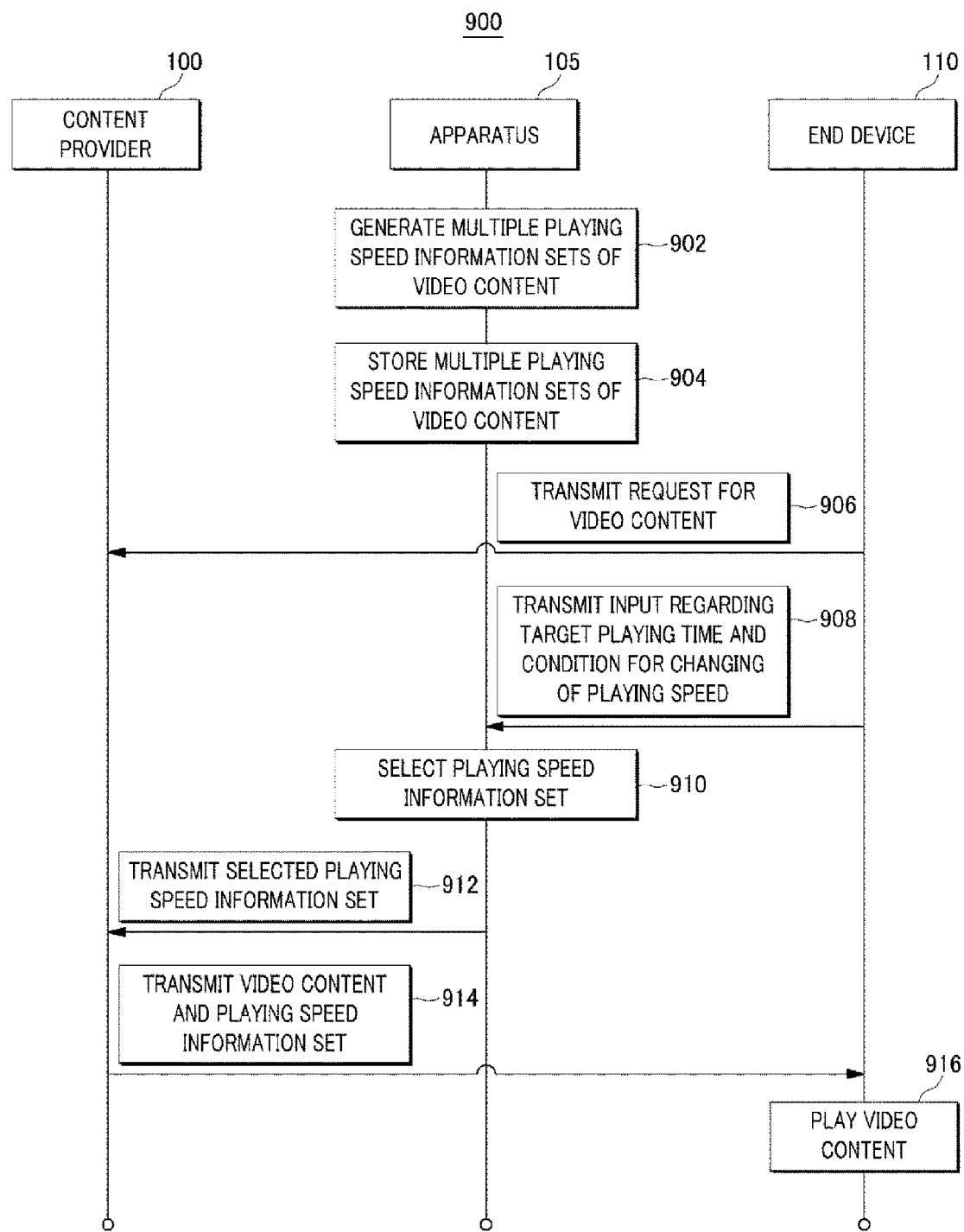
FIG. 9 shows another example processing flow of operations by which at least portions of control of video content play speed may be implemented, in accordance with various embodiments described herein.

FIG. 9 shows another example processing flow 900 of operations by which at least portions of control of video content play speed may be implemented, in accordance with various embodiments described herein. The operations of processing flow 900 may be implemented in system configuration 10 including content provider 100, apparatus 105 and end device 110, as illustrated in FIG. 1. Processing flow 900 may include one or more operations, actions, or functions as illustrated by one or more blocks 902, 904, 906, 908, 910, 912, 914 and/or 916. Although illustrated as discrete blocks, various blocks may be divided into additional blocks, combined into fewer blocks, or eliminated, depending on the desired implementation. Processing may begin at block 902.

Block 902 (Generate Multiple Playing Speed Information Sets of Video Content) may refer to apparatus 105 generating multiple sets of playing speed information of video content according to various kinds of conditions to change the playing speed and various target playing times. By way of example, apparatus 105 may determine a first priority value for each scene of the video content based on a first condition for changing of the playing speed (e.g., whether a designated person appears in the video content). Further, apparatus 105 may determine a playing speed of each scene based on the first priority value and a first target playing time (e.g., 1 hour). Then, apparatus 105 may generate a first set of playing speed information that includes the playing speed of each scene, which may be determined based on the first priority value and the first target playing time. Further, apparatus 105 may determine a second priority value for each scene based on a second condition for changing the playing speed (e.g., an amount of pixel changes in respective scenes is equal to or greater than a threshold value). Further, apparatus 105 may determine a playing speed of each scene based on the second priority value and a second target playing time (e.g., 1.5 hours). Then, apparatus 105 may generate a second set of playing speed information that includes the playing speed of each of the scenes, which may be determined based on the second priority value and the second target playing time. Processing may proceed from block 902 to block 904.

Block 904 (Store Multiple Playing Speed Information Sets of Video Content) may refer to apparatus 105 storing the multiple sets of playing speed information of video content, which are generated at block 902, in a memory that may be communicatively coupled to apparatus 105. Processing may proceed from block 904 to block 906.

Block 906 (Transmit Request for Video Content) may refer to end device 110 transmitting, to content provider 100 via network 200, a request for the video content. Processing may proceed from block 906 to block 908.

Block 908 (Transmit Input Regarding Target Playing Time and Condition for Changing of Playing Speed) may refer to end device 110 transmitting, to apparatus 105 via network 200, an input regarding a target playing time of the video content and a condition for changing a playing speed of the video content. Processing may proceed from block 908 to block 910.

Block 910 (Select Playing Speed Information Set) may refer to apparatus 105 selecting one set of playing speed information, which are stored at block 904, based on the input that includes the target playing time and the condition for changing the playing speed. For example, if the received target playing time is one hour and the received condition for changing the playing speed is a name of a designated person who may appear in the video content, apparatus 105 may be configured to select the first set of playing speed information, which may be determined based on the first condition for changing the playing speed (e.g., whether the designated person appears in the video content) and the first target playing time (e.g., 1 hour). Processing may proceed from block 910 to block 912.

Block 912 (Transmit Selected Playing Speed Information Set) may refer to apparatus 105 transmitting, to content provider 100 via network 200, the selected set of playing speed information. Processing may proceed from block 912 to block 914.

Block 914 (Transmit Video Content and Playing Speed Information Set) may refer to content provider 100 transmitting the video content and the selected set of playing speed information. Content provider 100 may transmit, to end device 110 via network 200, the video content, which may be requested at block 906 in response to the content request of block 906. Further, content provider 100 may transmit, to end device 110 via network 200, the received set of playing speed information including the determined playing speed of the scenes of the video content. Processing may proceed from block 914 to block 916.

Block 916 (Play Video Content) may refer to end device 110 playing the video content. End device 110 may receive, from content provider 100, the video content and the selected set of playing speed information including the determined playing speed of the scenes of the video content. Further, end device 110 may play the video content while speeding up or slowing down a playing speed of at least one scene of the video content according to the determined playing speed of each respective scene of the video content.

Thus, FIG. 9 shows another example processing flow 900 of operations by which at least portions of control of video content play speed may be implemented, in accordance with various embodiments described herein.

Figure 10:
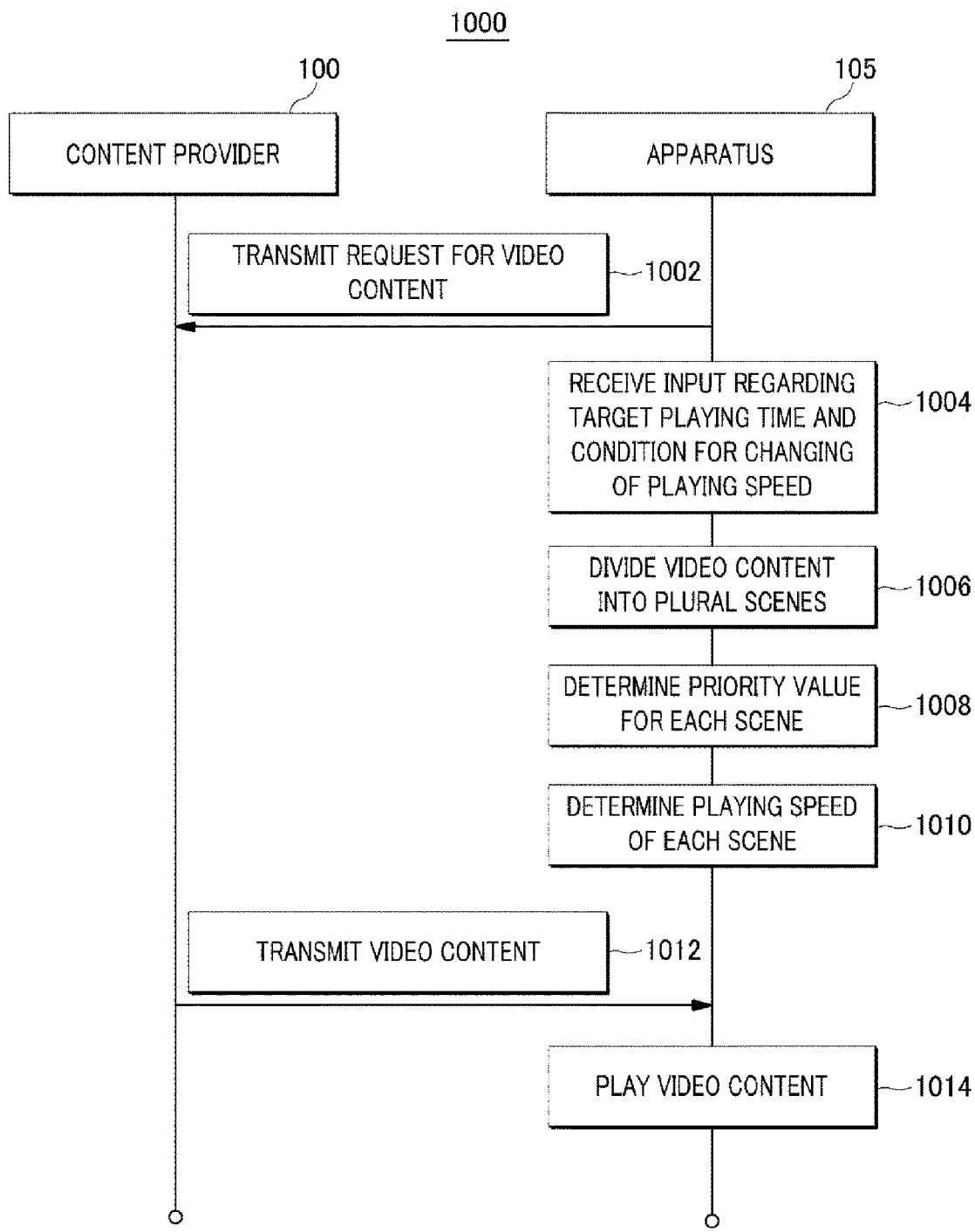
FIG. 10 shows still another example processing flow of operations by which at least portions of control of video content play speed may be implemented, in accordance with various embodiments described herein.

FIG. 10 shows still another example processing flow 1000 of operations by which at least portions of control of video content play speed may be implemented, in accordance with various embodiments described herein. The operations of processing flow 1000 may be implemented in system configuration 10 including content provider 100 and apparatus 105, as illustrated in FIG. 1. Processing flow 1000 may include one or more operations, actions, or functions as illustrated by one or more blocks 1002, 1004, 1006, 1008, 1010, 1012 and/or 1014. Although illustrated as discrete blocks, various blocks may be divided into additional blocks, combined into fewer blocks, or eliminated, depending on the desired implementation. Processing may begin at block 1002.

Block 1002 (Transmit Request for Video Content) may refer to apparatus 105 transmitting, to content provider 100 via network 200, a request for video content. Processing may proceed from block 1002 to block 1004.

Block 1004 (Receive Input regarding Target Playing Time and a Condition for Changing of Playing Speed) may refer to apparatus 105 receiving an input regarding a target playing time of the video content and a condition for changing a playing speed of the video content. As a non-limiting example, a user of apparatus 105 may enter the input via a user interface displayed on a display, which may be communicatively coupled to apparatus 105, and apparatus 105 may receive the input. Processing may proceed from block 1004 to block 1006.

Block 1006 (Divide Video Content into Plural Scenes) may refer to apparatus 105 dividing the video content into plural scenes having one or more contextually related frames. In some embodiments, apparatus 105 may quantify a similarity between adjacent frames of the video content. Then, apparatus 105 may determine each scene to have at least one frame from among the adjacent frames based on the quantified similarity. In some embodiments, apparatus 105 may compare the quantified similarity with a predetermined threshold value. If the quantified similarity is equal to or greater than the predetermined threshold value, apparatus 105 may determine the adjacent frames to be contextually related and included in a common scene. Processing may proceed from block 1006 to block 1008.

Block 1008 (Determine Priority Value for Each Scene) may refer to apparatus 105 determining a priority value for each scene based at least in part on the condition for changing of the playing speed, which may be received at block 1004. By way of another example, but not limitation, the condition for changing the playing speed may include whether an amount of pixel changes in respective scenes is higher than a threshold value. Apparatus 105 may calculate the amount of pixel changes in each scene of the video content, and compare the calculated amount of pixel changes to the threshold value that may be stored in a memory. If the calculated amount of pixel changes in a scene is equal to or greater than the threshold value, apparatus 105 may determine a priority value of the scene to be higher than another scene for which the calculated amount of pixel changes is less than the threshold value. Processing may proceed from block 1008 to block 1010.

Block 1010 (Determine Playing Speed of Each Scene) may refer to apparatus 105 determining a playing speed of each scene of the video content based at least in part on the priority value of respective scenes, which determined at block 1008, and the target playing time, which is received at block 1004. By way of example, apparatus 105 may be configured to determine a playing speed of each scene of the video content in inverse proportion to the priority value in order for a total playing time for all of the scenes to be the target playing time. Processing may proceed from block 1010 to block 1012.

Block 1012 (Transmit Video Content) may refer to content provider 100 transmitting, to apparatus 105 via network 200, the video content, which may be requested at block 1002, in response to the content request of block 1002. Processing may proceed from block 1012 to block 1014.

Block 1014 (Play Video Content) may refer to apparatus 105 playing the video content. Apparatus 105 may receive, from content provider 100, the video content, and play the video content while speeding up or slowing down a playback of at least one scene of the video content based on the information regarding the determined playing speed of each respective scene of the video content.

Thus, FIG. 10 shows still another example processing flow 1000 of operations by which at least portions of control of video content play speed may be implemented, in accordance with various embodiments described herein.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 11:
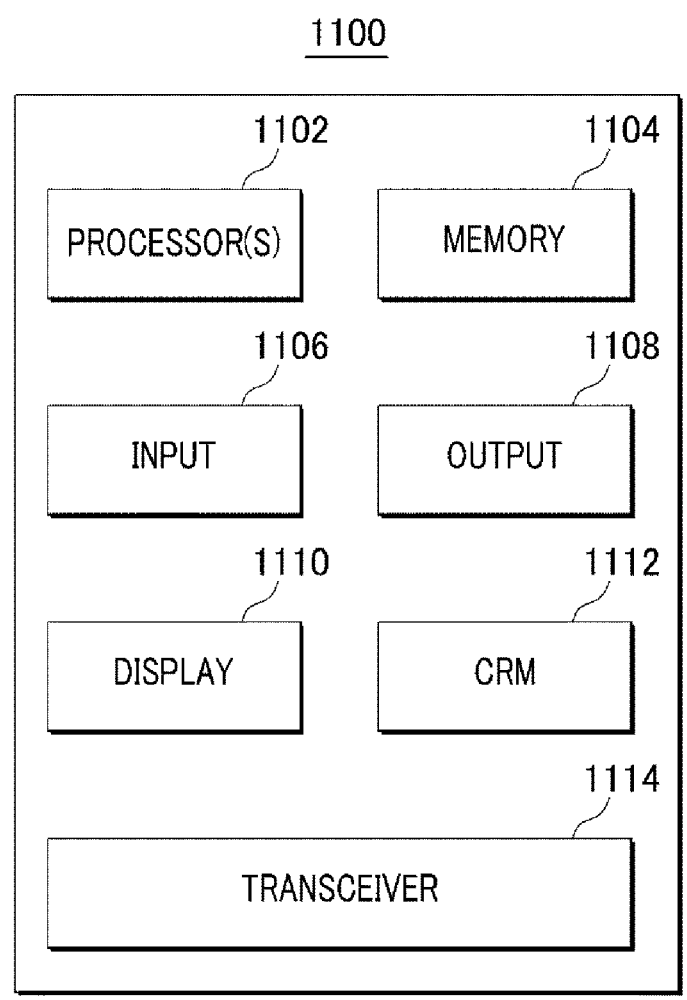
FIG. 11 shows an illustrative computing embodiment, in which any of the processes and sub-processes of control of video content play speed may be implemented as computer-readable instructions stored on a computer-readable medium, in accordance with various embodiments described herein.

FIG. 11 shows an illustrative computing embodiment, in which any of the processes and sub-processes of control of video content play speed may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 1100 may typically include, at least, one or more processors 1102, a system memory 1104, one or more input components 1106, one or more output components 1108, a display component 1110, a computer-readable medium 1112, and a transceiver 1114.

Processor 1102 may refer to, e.g., a microprocessor, a microcontroller, a digital signal processor, or any combination thereof.

Memory 1104 may refer to, e.g., a volatile memory, non-volatile memory, or any combination thereof. Memory 1104 may store, therein, an operating system, an application, and/or program data. That is, memory 1104 may store executable instructions to implement any of the functions or operations described above and, therefore, memory 1104 may be regarded as a computer-readable medium.

Input component 1106 may refer to a built-in or communicatively coupled keyboard, touch screen, or telecommunication device. Alternatively, input component 1106 may include a microphone that is configured, in cooperation with a voice-recognition program that may be stored in memory 1104, to receive voice commands from a user of computing device 1100. Further, input component 1106, if not built-in to computing device 1100, may be communicatively coupled thereto via short-range communication protocols including, but not limitation, radio frequency or Bluetooth.

Output component 1108 may refer to a component or module, built-in or removable from computing device 1100, that is configured to output commands and data to an external device.

Display component 1110 may refer to, e.g., a solid state display that may have touch input capabilities. That is, display component 1110 may include capabilities that may be shared with or replace those of input component 1106.

Computer-readable medium 1112 may refer to a separable machine readable medium that is configured to store one or more programs that embody any of the functions or operations described above. That is, computer-readable medium 1112, which may be received into or otherwise connected to a drive component of computing device 1100, may store executable instructions to implement any of the functions or operations described above. These instructions may be complimentary or otherwise independent of those stored by memory 1104.

Transceiver 1114 may refer to a network communication link for computing device 1100, configured as a wired network or direct-wired connection. Alternatively, transceiver 1114 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system, comprising:
    a content provider configured to transmit video content including a plurality of scenes, each scene having one or more contextually related frames; and
    an apparatus configured to:
        receive an input including a target playing time of the video content and a condition for changing a playing speed, wherein the condition for changing the playing speed includes whether a designated person appears in the video content or whether dialog is detected, determine a priority value for each of the scenes based at least in part on the condition for changing the playing speed, the priority value being a numerical value that is assigned to each of the scenes based on whether each of the scenes satisfies the condition for changing the playing speed, and determine a playing speed of each of the scenes based at least in part on the determined priority value for each of the scenes and the target playing time of the video content.

2. The system of claim 1, wherein the apparatus is further configured to transmit information regarding the determined playing speed of each of the scenes to the content provider.

3. The system of claim 2, further comprising:
an end device configured to:
transmit a request for the video content to the content provider,
transmit the input to the apparatus, and
receive the video content from the content provider,
wherein the content provider is further configured to transmit, to the end device, the video content and the information regarding the determined playing speed of each of the scenes.

4. The system of claim 3, wherein the end device is further configured to play the video content while speeding up or slowing down the playing of respective ones of the scenes based at least in part on the information regarding the determined playing speed of each respective scene.

5. The system of claim 1, further comprising:
an end device configured to:
transmit a request for the video content to the content provider,
transmit the input, and
receive the video content from the content provider,
wherein the apparatus is further configured to:
receive the input from the end device,
transmit information regarding the determined playing speed of respective ones of the scenes of the video content to the end device,
wherein the content provider is further configured to transmit the video content to the end device.

6. The system of claim 5, wherein the end device is further configured to play the video content while speeding up or slowing down the playing of respective ones of the scenes based at least in part on the information regarding the determined playing speed of each respective scene.

7. The system of claim 1, wherein the apparatus is further configured to play the video content while speeding up or slowing down the playing of respective ones of the scenes according to the determined playing speed of each respective scene.

8. The system of claim 1, wherein the apparatus is further configured to:
quantify a similarity between adjacent frames, and
determine the adjacent frames to be contextually related based at least in part on the quantified similarity.

9. The system of claim 8, wherein the apparatus is further configured to:
quantify the similarity between a previous frame and a current frame,
if the quantified similarity between the previous frame and the current frame is equal to or larger than a predetermined value, determine the previous frame and the current frame to be contextually related, and
if the quantified similarity between the previous frame and the current frame is smaller than the predetermined value, determine the previous frame and the current frame to be not contextually related.

10. The system of claim 1,
wherein the apparatus is further configured to determine the priority value of each of the plurality of scenes based at least in part on whether the designated person appears in respective ones of the scenes.

11. The system of claim 1,
wherein the apparatus is further configured to determine the priority value of each of the plurality of scenes based at least in part on whether the designated person is heard in respective ones of the scenes.

12. The system of claim 1, wherein the condition for changing the playing speed includes whether an amount of pixel changes in respective ones of the scenes is higher than a first threshold value or whether an audio signal magnitude in respective ones of the scenes is higher than a second threshold value.

13. The system of claim 1,
wherein the apparatus is further configured to determine the priority value of each of the plurality of scenes based at least in part on whether the dialog is detected in respective ones of the scenes.

14. A server, comprising:
an input receiving unit configured to receive an input including a target playing time of video content that includes a plurality of scenes and a condition for changing a playing speed, each scene having one or more contextually related frames, the condition for changing the playing speed including whether a designated person appears in the video content or whether dialog is detected;
wherein the server is configured to:
determine a priority value for each of the scenes based at least in part on the condition for changing the playing speed, the priority value being a numerical value that is assigned to each of the scenes based on whether each of the scenes satisfies the condition for changing the playing speed; and
determine a playing speed of each of the scenes based at least in part on the determined priority value for each of the scenes and the target playing time of the video content.

15. The server of claim 14,
wherein the input receiving unit is further configured to receive the input from an end device, and
the server further comprises:
a transmitting unit to transmit information regarding the determined playing speed of each of the scenes to the end device.

16. The server of claim 15, wherein the transmitting unit is further configured to transmit the information regarding the determined playing speed of each of the scenes to a content provider that transmits the video content to at least one of the apparatus or the end device.

17. The server of claim 14, further comprising:
a content displaying unit configured to speed up or slow down the playing of respective ones of the scenes according to the determined play speed of each of the scenes.

18. The server of claim 14,
wherein the server is further configured to:
quantify a similarity between adjacent frames, and
determine the adjacent frames to be contextually related based at least in part on the quantified similarity.

19. The server of claim 18, wherein the server is further configured to:
quantify the similarity between a previous frame and a current frame,
if the quantified similarity between the previous frame and the current frame is equal to or larger than a predetermined value, determine the previous frame and the current frame to be contextually related, and if the quantified similarity between the previous frame and the current frame is smaller than the predetermined value, determine the previous frame and the current frame to be not contextually related.

20. The server of claim 14,
wherein the server is further configured to determine the priority value of each of the plurality of scenes based at least in part on whether the designated person appears in respective ones of the scenes.

21. The server of claim 14,
wherein the server is further configured to determine the priority value of each of the plurality scenes based at least in part on whether the designated person is heard in respective ones of the scenes.

22. The server of claim 14, wherein the condition for changing the playing speed includes whether an amount of pixel changes in respective ones of the scenes is higher than a first threshold value or an audio signal magnitude in respective ones of the scenes is higher than a second threshold value.

23. The server of claim 14,
wherein the server is further configured to determine the priority value of each of the plurality of scenes based at least in part on whether the dialog is detected in respective ones of the scenes.

* * * * *